US006417290B1

(12) United States Patent
Ampleman et al.

(10) Patent No.: US 6,417,290 B1
(45) Date of Patent: Jul. 9, 2002

(54) SYNTHESIS OF ENERGETIC POLYESTER THERMOPLASTIC HOMOPOLYMERS AND ENERGETIC THERMOPLASTIC ELASTOMERS FORMED THEREFROM

(75) Inventors: Guy Ampleman, St. Augustin; Sylvie Brochu, Val-Bélair, both of (CA)

(73) Assignee: Department of National Defence, Ottawa (CA)

( * ) Notice: Subject to any disclaimer, the term of this patent is extended or adjusted under 35 U.S.C. 154(b) by 0 days.

(21) Appl. No.: 09/770,380

(22) Filed: Jan. 29, 2001

(51) Int. Cl.[7] ............................................... C08G 63/91
(52) U.S. Cl. ........................ 525/415; 528/359; 149/19.5
(58) Field of Search ........................ 525/415; 528/359; 149/19.5

(56) References Cited

U.S. PATENT DOCUMENTS

| 2,853,474 A | | 9/1958 | Reynolds et al. ........... 260/78.3 |
| 2,977,373 A | | 3/1961 | Reynolds et al. ........ 260/343.9 |
| 4,806,613 A | * | 2/1989 | Wardle ........................ 528/59 |
| 4,919,737 A | * | 4/1990 | Biddle ...................... 149/19.5 |
| 4,952,644 A | * | 8/1990 | Wardle ...................... 525/410 |

FOREIGN PATENT DOCUMENTS

| GB | 775495 | 8/1955 |

OTHER PUBLICATIONS

R. Thiebaut, et al., of Laboratoires de Recherches de la Société Kodak–Pathé Publication entitled "Nouveaux Polyesters à partir de Bêta–Lactones substituées"; Oct. 1961; pp. 13 through 19.

* cited by examiner

*Primary Examiner*—Patricia A. Short
(74) *Attorney, Agent, or Firm*—Paul S. Sharpe; (Marks & Clerk)

(57) ABSTRACT

Polymerization of α-bromomethyl-α-methyl-β-propiolactone (BMMPL) or α-chloromethyl-α-methyl-β-propiolactone (CMMPL) yielded thermoplastic homopolymers that upon azidation led to a novel energetic thermoplastic polyester: poly(α-azidomethyl-α-methyl-β-propiolactone) (PAMMPL). An energetic copolyether-ester thermoplastic elastomer was prepared by using glycidyl azide polymer, a dihydroxyl terminated energetic polymer, as a macroinitiator for the polymerization of BMMPL or CMMPL. The azidation of the resulting copolyether-ester yielded an energetic thermoplastic elastomer that melted at between 80° C. and 85° C. Polymerization of α-dibromomethyl-β-propiolactone (DBMPL) resulted in a polymer which upon azidation yielded a new energetic polymer that can be used as a binder or into an energetic thermoplastic elastomer synthesis.

11 Claims, 3 Drawing Sheets

Synthesis of GAP-co-PAMMPL

FIGURE 3
Synthesis of α-dibromomethyl-β-propiolactone (DBMPL)
PENTAERYTHRITOL
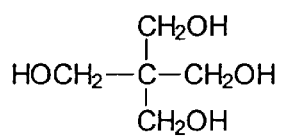
$\xrightarrow[\text{reflux}]{\text{HBr} \atop \text{CH}_3\text{COOH}}$
BDBMPAc
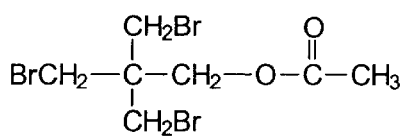
HNO$_3$
80 °C
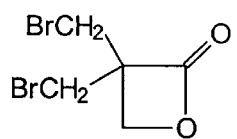
$\xleftarrow[\text{CH}_2\text{CL}_2/\text{H}_2\text{0}]{\text{K}_2\text{CO}_3}$
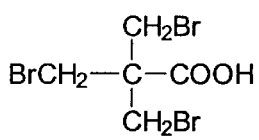
DBMPL                    BDBMPA

SYNTHESIS OF ENERGETIC POLYESTER THERMOPLASTIC HOMOPOLYMERS AND ENERGETIC THERMOPLASTIC ELASTOMERS FORMED THEREFROM

FIELD OF THE INVENTION

The present invention relates to energetic polyester thermoplastic homopolymers and more particularly to the synthesis thereof and to energetic copolyether-ester thermoplastic elastomers obtained therefrom.

BACKGROUND OF THE INVENTION

High-energy solid compositions such as propellants and composite explosives are usually prepared by combining a variety of materials including oxidizers, binders, plasticizers and a curing agent. Many energetic binders are available for use in the preparation of these high-energy compositions. Usually, these binders are obtained by a curing reaction involving the use of isocyanates and polyhydroxyl energetic or non energetic prepolymers. The binders give the insensitive character to high energy compositions. For composite explosives, the use of these binders leads to plastic bounded explosives (PBXs), which are chemically crosslinked and not recyclable. Moreover, the existing melt cast facilities are not suitable for cast-cured PBX. An elegant way to formulate PBXs in available melt cast facilities is to use thermoplastic elastomers. Moreover, an advantage of using thermoplastic elastomers is that they lead to recyclable PBXs. Furthermore, it would be more desirable to use energetic thermoplastic elastomers because replacing explosives by energetic binders in the composition results in a lesser loss of energy in comparison with non energetic binders. The limitation of this technology is that thermoplastic elastomers melting in the range of between 80° C. and 100° C. are needed in order to be processed in the existing melt-cast facilities and that those melting at higher temperatures are not suitable for this process. For years, researchers have tried to synthesize energetic thermoplastic elastomers melting between 80° C. and 100° C. In U.S. Pat. No. 4,707,540, issued to Manser, in 1987, it was established that the polymerization of numerous oxetane monomers yielded energetic homopolymers that could be used as binders. Among these oxetane polymers, Manser isolated BAMO, an energetic thermoplastic homopolymer which melts at 83° C. Until now BAMO was the only available energetic thermoplastic homopolymer.

U.S. Pat. No. 4,806,613, issued to Wardle, in 1989, showed that energetic thermoplastic elastomers could be prepared directly in the mixer by block polymerization of BAMO with other oxetane polymers.

Wardle also showed in U.S. Pat. No. 4,952,644, that ABA triblocks or star thermoplastic elastomers could be obtained by polymerization of the BAMO monomers with other oxetanes monomers. Although useful, all these energetic thermoplastic elastomers must comprise BAMO as the hard segment. Since energetic thermoplastic elastomers are potential products to introduce in and prepare insensitive high-energy compositions, there is a need to develop new energetic thermoplastic homopolymers and energetic thermoplastic elastomers.

SUMMARY OF THE INVENTION

An object of one embodiment of the present invention is to provide the synthesis of novel energetic polyester thermoplastic homopolymers by the polymerization of α-bromomethyl-α-methyl-β-propiolactone (BMMPL) or α-chloromethyl-α-methyl-β-propiolactone (CMMPL) to yield thermoplastic homopolymers which upon azidation, lead to a novel energetic thermoplastic polyester: poly(α-azidomethyl-α-methyl-β-propiolactone) (PAMMPL).

A further object of the embodiment of the present invention is an energetic thermoplastic polyester of the formula:

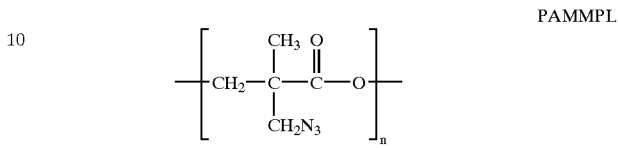

PAMMPL where n is 4 to 1500. This new energetic polyester melts at 80° C. and can be used as the hard block of an energetic thermoplastic elastomer.

Another object of this invention is to provide a process to synthesize energetic copolyether-ester thermoplastic elastomers and particularly those copolyether-esters that are obtained by using energetic dihydroxyl terminated prepolymers such as glycidyl azide polymer as macroinitiators for the polymerization of α-bromomethyl-α-methyl-β-propiolactone (BMMPL) or α-chloromethyl-α-methyl-β-propiolactone (CMMPL) followed by the azidation of the resulting copolymers. The resulting copolyether-esters are energetic thermoplastic elastomers, which melt at 80° C.

Another object of the present invention is also to provide the synthesis of a novel energetic polyester homopolymer by the polymerization of α-dibromomethyl-β-propiolactone (DBMPL) to yield an homopolymer which upon azidation, led to a novel energetic polyester: poly(α-diazidomethyl-β-propiolactone) (PDAMPL). This new energetic polyester can be used as a binder or be introduced in an energetic thermoplastic elastomer synthesis.

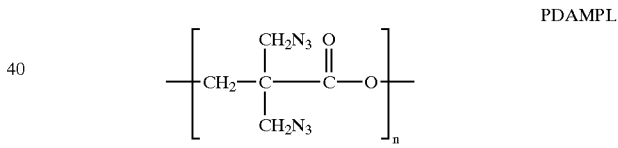

PDAMPL

Where n could be 3 to 1100 leading to molecular weights between 500 to 200 000 g/mol.

In accordance with another feature of the present invention, there is provided a process for preparing an energetic copolyether-ester thermoplastic elastomer of type ABA. This process comprises the step of using an energetic dihydroxyl terminated polymer as a macroinitiator to polymerize α-bromomethyl-α-methyl-β-propiolactone (BMMPL) or α-chloromethyl-α-methyl-β-propiolactone (CMMPL) followed by the azidation of the resulting copolymer. The structure of the resulting copolyether-ester can be illustrated as followed:

PAMMPL-DHTEP-PAMMPL where PAMMPL is the hard polyester block A and DHTEP is the dihydroxyl terminated polyether used as the soft block B. Preferably, the dihydroxyl terminated energetic polymer (soft segment) has a molecular weight ranging from about 500 to about 100,000 g/mol and the PAMMPL (hard segment) has a molecular weight of 500 to 200,000 g/mol. Preferably, the dihydroxyl terminated prepolymer is glycidyl azide polymer (GAP), but is not limited to and could be applied to other hydroxyl terminated energetic prepolymer selected from the group consisting of: poly 3-azidomethyl- 3-methyloxetane (AMMO), poly 3-nitratomethyl-3-methyloxetane (NIMMO) and poly glycidyl nitrate (GLYN).

Those skilled in the art will see that the functionality of the soft segment is not restricted to two. In fact, using the process with a difunctional soft segment resulted in an ABA triblock copolymer but using a monofunctional soft segment would have resulted in an AB diblock copolymer. The use of a tri-, tetra- or polyfunctional soft segment would have led to star shaped or grafted thermoplastic elastomers.

Yet another object of one embodiment of the present invention is to provide an energetic for use as a prepolymer for binder or thermoplastic elastomer synthesis having the formula:

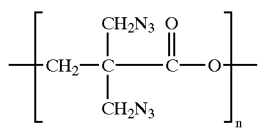

PDAMPL

Where n could be 3 to 1100 leading to molecular weights between 500 to 200 000 g/mol which can be used as a binder or be introduced in an energetic thermoplastic elastomer synthesis.

Having thus generally denoted the invention, reference will now be made to the accompanying drawings.

BRIEF DESCRIPTION OF THE DRAWINGS

FIG. 3 is a schematic illustration of a reaction sequence for forming DBMPL.

DETAILED DESCRIPTION OF PREFERRED EMBODIMENTS

Figure 1:
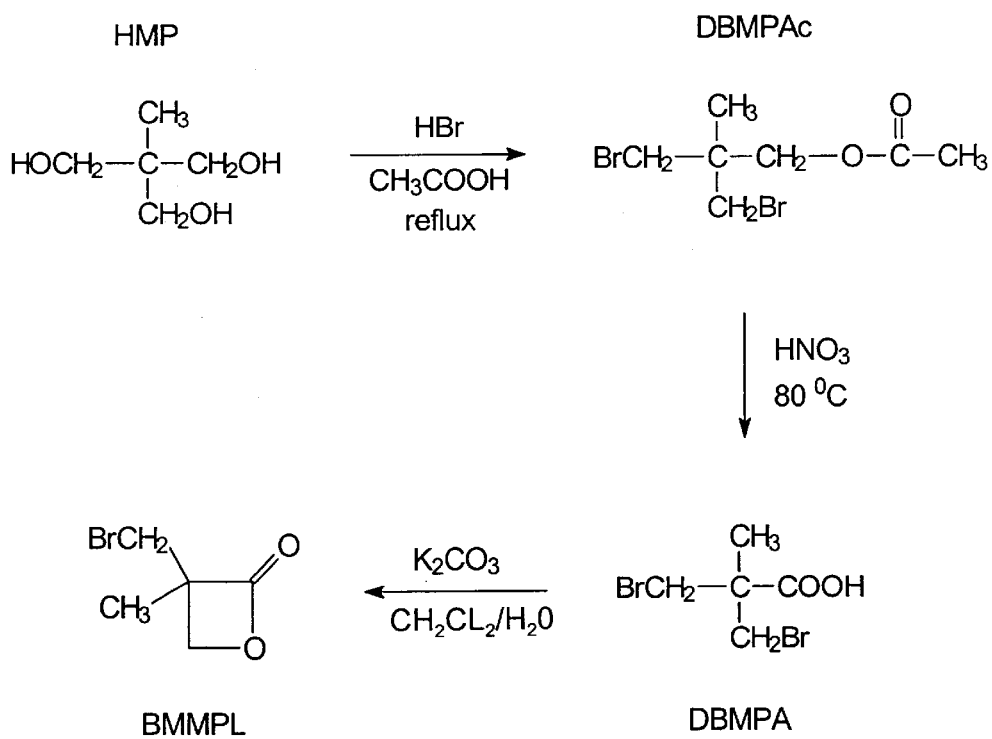
FIG. 1 is a schematic illustration of a reaction sequence for forming BMMPL.

Thermoplastic elastomers (TPE) are copolymers of the type triblock ABA, diblock AB or multiblock $(AB)_n$ where A and B are the hard and soft segments, respectively. Star shaped and grafted copolymers that include A and B blocks are also thermoplastic elastomers. The hard segment is capable of crystallization or association and gives the thermoplastic behavior to the copolymer, whereas the soft segment gives the elastomeric behavior to the copolymer. In practice, at room temperature, a thermoplastic elastomer behaves like a rubber because it is crosslinked in the same fashion as a conventional elastomer, but with reversible physical crosslinks. Since the physical crosslinks are reversible, the thermoplastic elastomer can be melted or dissolved in a solvent, so that the polymer can be mixed with other components of, for example, a melt cast explosive. A gun or rocket propellant or a composite explosive could be isolated upon cooling or evaporating the solvent. Cooling or evaporating the solvent lets the broken physical crosslinks reform and the elastomeric properties are recovered. Therefore, obsolete material can be melted or dissolved before the separation of the components leading to a recyclable material. The molecular weight of the soft segment and the hard segment must be balanced to get good mechanical properties. Since it is very difficult to predict the mechanical properties of the thermoplastic elastomer, it is often challenging to find the perfect balance for the molecular weights of both segments.

In the present invention, the novel energetic thermoplastic polyester was synthesized by polymerizing α-bromomethyl-α-methyl-β-propiolactone (BMMPL) or α-chloromethyl-α-methyl-β-propiolactone (CMMPL) to isolate poly(α-bromomethyl-α-methyl-β-propiolactone) (PBMMPL) or poly(α-chloromethyl-α-methyl-β-propiolactone) (PCMMPL). The azidation of PBMMPL or PCMMPL in dimethylformamide at 90° C. and 120° C., respectively yielded poly(α-azidomethyl-α-methyl-β-propiolactone) (PAMMPL). All the attempts to do azidation of the BMMPL or CMMPL monomers failed and resulted in the polymerization of the lactones. Sodium azide as a nucleophile initiated the polymerization and poor yields were observed. Many initiators are suitable for the polymerization of β-propiolactones.

Cationic initiators usually lead to low molecular weight polymers. Suitable examples of cationic initiators include, Lewis acids, trifluoroacetic acid, acetyl perchlorate, trifluoroacetic anhydride/aluminum trichloride, boron trifluoride and its derivatives, halonium salts (dialkylbromonium hexafluoroantimonate, etc), trifluoromethanesulfonic acid, methyl triflate, inter alia. High molecular weight polymers can be obtained with the use of anionic or organometallic compounds.

Suitable anionic initiators useful for the polymerization of lactones include, tertiary amines (triethylamine, pyridine and its derivatives, etc.), betaines, phosphines (trialkyl or triaryl phophines, etc), sulfides, sodium or potassium, sulfonium salts, ammonium salts, (tetraalkylammonium hydroxides, etc.) carboxylates salts (potassium benzoate, tetraalkylammonium acetates, etc), alkoxides (potassium methoxide, lithium t-butoxide, magnesium ethoxide, etc.), hydroxides (potassium hydroxide and other alkali metal hydroxides), alkyl salts (butyllithium and other alkali metal salts, etc.) inter alia.

Organometallic initiators formed to be useful include, aluminum derivatives (trialkylaluminum, halogenated derivatives of alkylaluminum or aluminum, aluminum or alkylaluminum alkoxides, aluminum porphyrins, etc.), zinc derivatives (dialkylzinc, zinc or alkylzinc alkoxides, halogenated derivatives of zinc or alkylzinc, etc.) tin derivatives (alkyltin or tin alkoxides, tin 2-ethylhexanoate, dialkyltin oxides, halogenated derivatives of alkyltin or tin, distannoxanes, tin (II) oxide, etc), titanium derivatives (titanium alkoxides, etc), zirconium derivatives (zirconium alkoxides, etc.), nickel derivatives (nickel carboxylate, etc.), cadmium derivatives (dialkyl cadmium, etc.), yttrium derivatives (yttrium alkoxides, etc.).

Organometallic initiators are often used with small amounts of co-initiators, including water, polyhydroxylated compounds (ethylene glycol, butanediol, pentaerythritol, etc.), complexing agents (diethyl ether, acetylacetone, tetrahydrofuran, etc.), etc. The preferred proportion of catalysts vary generally from between 0.1 and 1 mole of co-initiator per mole of active group of initiator. The preferred initiator to monomer ratio is between 0.1 and 25% mol/mol. The presence of diluents is sometimes desirable. Suitable diluents for the polymerization of these β-propiolactones are common organic solvents, such as toluene, tetrahydrofuran, dimethylformamide, dimethylsulfoxide, diethyl ether, etc. Lithium t-butoxide was chosen to polymerize both lactones. Those skilled in the art will know that different functionalities of the polylactones can also be obtained using di, tri- or tetra functional initiators.

α-bromomethyl-α-methyl-β-propiolactone (BMMPL) and α-chloromethyl-α-methyl-β-propiolactone (CMMPL) have to be synthesized prior to their polymerization.

CMMPL could be synthesized in a one step synthesis while BMMPL requires three steps.

According to FIG. 1, 2,2-dibromomethyl propyl acetate (DBMPAc) is obtained by acetylation and bromation of 2-hydroxymethyl-2-methyl-1,3-propanediol (HMP) in a one-pot step. DBMPAc is then oxidized to 2,2-dibromomethyl propionic acid (DBMPA) followed by lactonisation to isolate BMMPL. The same synthetic procedure was applied to prepare CMMPL, but started with the commercial 2,2-dichloromethyl propionic acid (DCMPA). Since only one step is needed to prepare CMMPL compared to three for the BMMPL, it would be more appropriate to use only CMMPL but once its polymerization is done with the macroinitiator, the azidation has to be conducted at 120° C. At this temperature, some degradation of GAP was observed as well as with the other energetic prepolymers. With PBMMPL, the temperature of azidation was 90° C. and degradation was not observed.

To prepare the energetic copolyether-ester thermoplastic elastomer, the dihydroxyl terminated prepolymer must be activated to serve as a macroinitiator. To remove the proton of the hydroxyl groups, many reagents can be used, such as organic and inorganic bases, and organometallic compounds. Example of suitable reagents include hydroxides (potassium hydroxide and other alkali metal hydroxides, etc.), hydrides (sodium hydride and other alkali metal hydrides, etc.), carbonates (potassium carbonate and other alkali metal carbonates, etc.), alkyl salts (butyllithium and other alkali metal lithium, etc.), carboxylates (potassium acetate and other alkali metal carboxylates, etc.), alkoxides (lithium t-butoxide and other alkali metal alkoxides, etc.), organometallics (aluminum derivatives, zinc derivatives, etc.).

Figure 2:
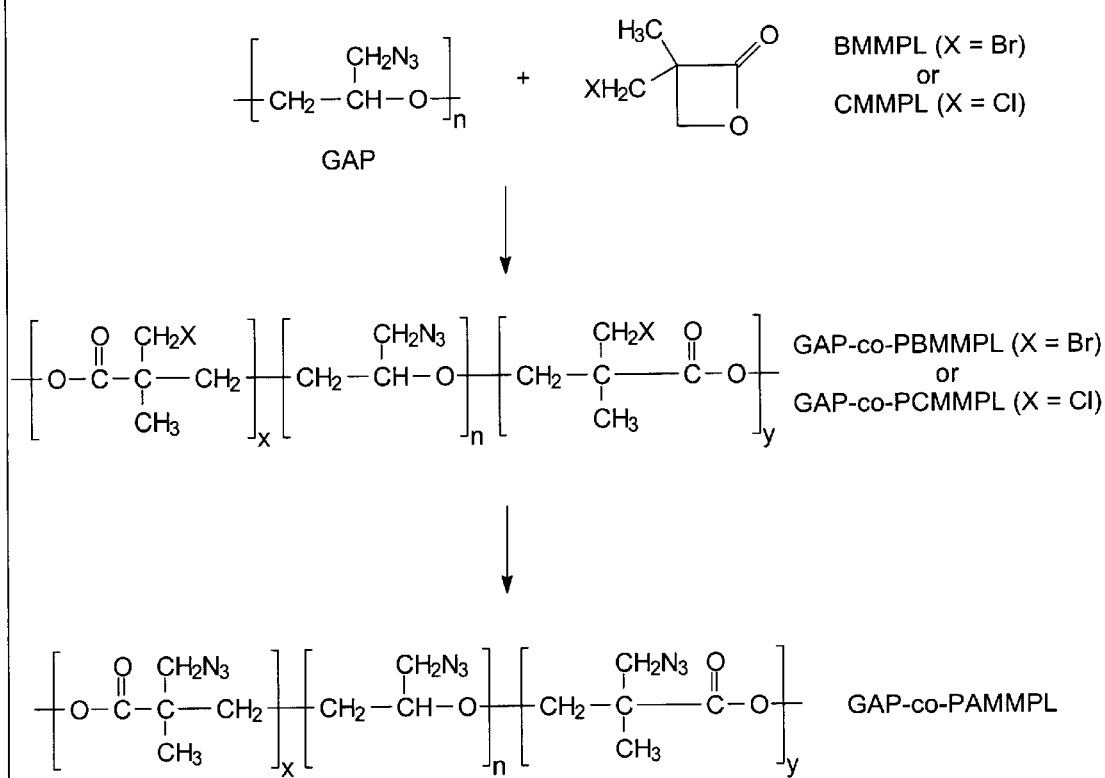
FIG. 2 is a schematic illustration of a reaction sequence for forming GAP-co-PAMMPL.

In this application n-butyl lithium was used to generate the alkoxide ion with GAP. The generated alkoxide ions functioned to initiate the polymerization of CMMPL or BMMPL. This copolymer was then reacted with sodium azide to isolate the energetic copolyether-ester thermoplastic elastomer. Different mechanical properties can be obtained by varying the molecular weights of the soft and hard segments. Soft to tough rubber or soft to hard waxes are among the possibilities for the appearance of the copolymer. Commercially available glycidyl azide polymer of molecular weight 2000 g/mol was used as the macroinitiator for the polymerization of BMMPL and CMMPL. Azidation of the resulting copolymers yielded energetic polyether-ester thermoplastic elastomer illustrated in FIG. 2. To increase the elastomeric behavior of the copolymer, a higher molecular weight (50 000 g/mol) GAP was synthesized and used as the macroinitiator. It was observed that more elasticity can be incorporated, but at the expense of a higher viscosity in the molten state. As mentioned supra, balancing the molecular weights of both segments can be challenging. It is believed that the best mechanical properties are obtained using a soft segment of 10 000 to 20 000 g/mol and hard segment of 10 000 to 15 000 g/mol on each side of the soft segment.

The synthesis of α-dibromomethyl-β-propiolactone (DBMPL) and α-dichloromethyl-β-propiolactone (DCMPL) is similar to the one of BMMPL, except that the starting material was pentaerythritol (see FIG. 3). Three steps are needed to complete each synthesis. The first step involved, in both cases, the simultaneous halogenation and acetylation of pentaerythritol to give 3-bromo-2,2-dibromomethylpropyl acetate or 3-chloro-2,2-dichloromethylpropyl acetate, respectively. Those acetates are then oxidized to 3-bromo-2,2-dibromomethyl propionic acid or 3-chloro-2,2-dichloromethyl propionic acid. DBMPL or DCMPL are then obtained by the cyclisation of the acids.

Having thus described the invention, reference will now be much to the examples.

Preface

As used herein

$^1$HNMR=proton nuclear magnetic resonance, $^{13}$CNMR= carbon nuclear magnetic resonance and s is representation of a singlet, d=doublet, q=quintuplet, m=multiplet Chemicals GAP $M_n$=2000 g/mol (GAP 2000) was obtained from 3M company, Minnesota, U.S.A. GAP $M_n$=50 000 g/mol was synthesized according to a known process developed by Vandenberg for the synthesis of a high molecular weight polyepichlorohydrin (PECH) followed by the azidation of this PECH to yield a high molecular weight GAP which was used as a macroinitiator.

EXAMPLE 1

α-bromomethyl-α-methyl-β-propiolactone (BMMPL)

1) Preparation of 2,2-dibromomethyl propyl acetate (DBMPAc)

In a round bottom flask, equipped with a condenser and a magnetic stirrer, a mixture of hydrogen bromide in acetic acid (30% w/w, 500 mL) and of 2-hydroxymethyl-2-methyl-1,3-propanediol (HMP) (100 g, 0,833 mol) was heated to reflux for 24 hours. The solution was then cooled and transferred into a separatory funnel. After the addition of cold water (1.2 L), the organic phase was separated and distilled to yield 2,2-dibromomethyl propyl acetate. The fraction boiling at 80° C. and 0.5 mm Hg was collected to yield 225 g of DBMPAc (0.781 mol, 94%).

$^1$HNMR: δ(CDCl$_3$) ppm: 1.18 (s, 3H,CH$_3$), 2.09 (s, 3H, CH$_3$CO), 3.42 (s, 4H, CH$_2$Br), 4.07 (s, 2H, CH$_2$)

2) Preparation of 2,2-dibromomethyl propionic acid (DBMPA)

In a three-neck flask equipped with an addition funnel, a large condenser, a thermometer and a magnetic stirrer, were introduced concentrated nitric acid (70%, 400 mL, 1.40 g/mL) and fuming nitric acid (50 mL, 1.52 mL). This solution was heated to 90° C. and DBMPAc (100 g, 0.347 mol) was added dropwise. The temperature was maintained between 80° C. and 90° C. for the duration of the addition. Red fumes evolved abundantly once approximately a third of the MDBMP was added. The mixture was heated at 80° C. and 90° C. for an additional two hours after the end of the addition and was stirred overnight at room temperature. It was then poured in 2 L of ice water. The solid was filtered, washed with ice water and used without further purification for the next step (73 g, 0.28 mol, 81%, Mp: 60–62° C.). The aqueous phase was extracted with chloroform to yield a supplementary 16 g of DBMPA (0.062 mol) which need to be purified by recrystallization in a mixture benzene/ petroleum ether to give almost a quantitative yield for the reaction.

$^1$HNMR: δ(CDCl$_3$) ppm: 1.49 (s, 3H,CH$_3$), 3.70 (q, 4H, CH$_2$Br), 10.5 (s, COOH).

3) Preparation of α-bromomethyl-α-methyl-β-propiolactone (BMMPL)

In a beaker equipped with a magnetic stirrer, DBMPA (60 g, 0.228 mol) was added to water (600 mL). To this suspension was added dropwise a potassium carbonate solution (1.0 M) until the pH of the solution was 8 (approximately 180 mL). When all the DBMPA was dissolved, the solution was quickly filtered into an Erlenmeyer flash and methylene chloride was added (600 mL). This mixture was strongly stirred for 18 hours and decanted into a separatory funnel. The organic phase was separated and the aqueous phase was washed with methylene chloride (2×300 mL). The organic phases were combined and dried over magnesium sulfate, filtered in a round bottom flask previously washed with hydrochloric acid (1 M) and evaporated to yield BMMPL (36 g, 0.20 mol). This product was rapidly filtered again on a neutral alumina column under dynamic vacuum into a round bottom flask also washed with HCl 1 M, dried over calcium hydride for three hours and distilled under vacuum over molecular sieves. The fraction boiling between 37° C. and 39° C. at 1 mm Hg was collected to yield 27 g (0.15 mol, 65%). This pure BMMPL was stored over molecular sieves and under a nitrogen atmosphere at 5° C.

$^1$HNMR: $\delta(CDCl_3)$ ppm: 1.59 (s, 3H,$CH_3$), 3.45, 3.67 (2 d, 2H, $CH_2Br$), 4.11, 4.39 (2 d, 2H, $CH_2$).

$^{13}$CNMR: $\delta(CDCl_3)$ ppm: 19.08 ($CH_3$), 33.43 ($CH_2Br$), 58.99 (C) 71.33 ($CH_2$), 171.49 (CO).

EXAMPLE 2

α-chloromethyl-α-methyl-β-propiolactone
(CMMPL)

The synthesis of CMMPL is similar to the synthesis of BMMPL, except that the starting available material was 2,2-dichloromethyl propionic acid (DCMPA) (20 g, 0.12 mol). It was poured into 800 mL of water, neutralized to pH 8 with a 1.0 M potassium carbonate solution (approximately 80–90 mL), filtered and vigorously agitated overnight with 800 mL of chloroform. The fraction boiling between 55° C. and 57° C. at 1 mm Hg was collected to yield 7.6 g (0.054 mol, 45%). This pure CMMPL was stored over molecular sieve and under a nitrogen atmosphere at 5° C.

$^1$HNMR: $\delta(CDCl_3)$ ppm: 1.56 (s, 3H,$CH_3$), 3.59, 3.81 (2 d, 2H, $CH_2Cl$), 4.12, 4.45 (2 d, 2H, $CH_2$).

$^{13}$CNMR: $\delta(CDCl_3)$ ppm: 18.22 ($CH_3$), 45.30 ($CH_2Cl$), 59.48 (C) 70.11 ($CH_2$), 171.74 (CO).

EXAMPLE 3

Poly(α-bromomethyl-α-methyl-β-propiolactone)
(PBMMPL)

Freshly distilled anhydrous BMMPL (2.21 g, 12.3 mmol) was injected into a flame-dried two-neck flask equipped with a magnetic stirrer, a nitrogen inlet and septa, previously flushed under vacuum and kept under a nitrogen stream. BMMPL was injected with a syringe precisely weighed before and after the injection. Anhydrous tetrahydrofuran (THF) (12.0 mL) was injected in the flask followed by an injection (496 µL) of a solution of lithium t-butoxide in THF (1.0 mol/L). In less than five minutes, the mixture was solid. After 24 hours, this solid was stirred in methanol (80 mL), filtered and dried under vacuum at 60° C. for 24 hours. PBMMPL was isolated as a fine white powder (1.56 g, 71%) and was insoluble in most organic solvents. DSC analyses revealed a melting point of 230–245° C. followed by decomposition of the polymer and an enthalpy of fusion of between 40 Jules/g and 50 Jules/g. Since the polyester is insoluble, molecular weight could not be determined.

EXAMPLE 4

Poly(α-chloromethyl-α-methyl-β-propiolactone)
(PCMMPL)

The procedure for the polymerization of CMMPL can be almost identical to the one for BMMPL, but other catalysts worked as well. As an example, a 1.0 M solution of triethylaluminium in hexane (2.24 mL, 2.24 mmol) and 20 µL (1.11 mmol) of water were injected into a flame-dried two-neck flask equipped with a magnetic stirrer, a nitrogen inlet and septa, previously flushed under vacuum and kept under a nitrogen stream. The initiator was then reacted 0.5 h and dried under vacuum 0.5 h. Anhydrous toluene (9 mL) and freshly distilled CMMPL (2.9 g, 22 mmol) were added to the two-neck flask. The solution formed a gel very quickly. After two hours, the polymer was precipitated in a 10% v/v solution of hydrochloric acid in methanol (100 mL) and washed with pure methanol until neutral, filtered and dried under vacuum at 60° C. for 24 h. PCMMPL was isolated as a fine white powder (2.87 g, 99%) and was insoluble in most organic solvents. DSC analyses revealed a melting point of between 200° C. and 250° C. followed by decomposition of the polymer and an enthalpy of fusion of same or provides 60–75 J/g. Since the polyester is insoluble, its molecular weight can not be determined.

EXAMPLE 5

Poly(α-azidomethyl-α-methyl-β-propiolactone)
(PAMMPL)

In a three-neck flask equipped with a condenser, a thermometer and a magnetic stirrer, were introduced PBMMPL (7.29 g, 40.7 mmol of $CH_2Br$) dimethylformamide (DMF, 88 mL) and sodium azide (2.92 g, 44.9 mmol). The suspension was heated to 90° C. for 18 hours and then poured in a beaker containing water (800 mL) to be stirred vigorously. The polymer was isolated by filtration and dried under vacuum at 60° C. for 24 hours, yielding 6.66 g of PAMMPL (99%). According to NMR spectroscopy, the azidation was complete. DSC analyses revealed a melting point of 85° C. and an enthalpy of fusion of 35–40 J/g. Since the polyester is only partly soluble in common organic solvents, its molecular weight could not be determined.

$^1$HNMR: $\delta(DMSO)$ ppm: 1.1 (s, 3H,$CH_3$), 3.5 (s, 2H, $CH_2N_3$), 4.1 (s, 2H, $CH_2$).

$^{13}$CNMR: $\delta(DMSO)$ ppm: 17.7 ($CH_3$), 46.8 (C), 54.1 ($CH_2N_3$) 66.3 ($CH_2$), 171.8 (CO).

The same procedure was applied with PCMMPL except that the temperature was 120° C. for 24 hours. PAMMPL was isolated as described with an overall yield of 71%. The spectroscopic analysis was identical. PAMMPL is a white cotton like solid that had a melting point of 80° C. and an enthalpy of fusion of same or provides 25–30 J/g. The molecular weight could not be determined because of the low solubility of this polymer in common organic solvents.

EXAMPLE 6

Synthesis of (GAP-2000)-co-PBMMPL
Thermoplastic Elastomer

GAP-2000 (0.316 g, 3.19 mmol of $CH_2N_3$) was thoroughly dried overnight under vacuum at 50° C. in a three-neck flask equipped with a stirrer, a nitrogen inlet and septa. GAP was then put under a nitrogen stream for the remainder of the reaction. Anhydrous tetrahydrofuran (3.2 mL) was added to the flask and, after complete dissolution of GAP, a 1.6 M solution of n-butyl lithium in hexane (0.164 mL,0.263 mmol) was injected, followed by 1.012 g (5.65 mmol) of BMMPL. The material (1.10 g, 83%) was recuperated 24 h later by precipitation in methanol, filtration and drying overnight under vacuum at 60° C. DSC analyses indicated a glass transition temperature of −29° C., characteristic of the soft segments of GAP. The melting point of the hard segments, expected above 200° C. from the results obtained for PBMMPL, could not be detected because of the decomposition of GAP beginning at 200° C. The molecular weight of this material could not be determined because of its insolubility in common organic solvents. The copolymer was composed of 52% mol/mol GAP, as evaluated by the quantity of nitrogen in the polymer determined by elementary analysis (%C=34.5%, %H=4.5% %N=10.7%).

EXAMPLE 7

Synthesis of (GAP 2000)-co-PAMMPL Energetic Thermoplastic Elastomer

In a three-neck flask equipped with a condenser, a thermometer and a magnetic stirrer, were introduced (GAP 2000)-co-PBMMPL (0.204 g), dimethylformamide (DMF, 4.0 mL) and sodium azide (0.074 g, 1.14 mmol). The suspension was heated to 90° C. for 18 hours and then poured in a beaker containing water to be stirred vigorously. After a few hours of agitation, the polymer stuck to the walls of the beaker; it was isolated by decantation of water and dried under vacuum at 60 ° C. for 24 hours, yielding 0.171 g of PAMMPL-GAP-PAMMPL. DSC analyses revealed a glass transition temperature of −26° C., a melting point between 80° C. and 85° C. and an enthalpy of fusion of 12 Jules/g. The molecular weight was estimated at 7300 g/mol from GPC measurements.

EXAMPLE 8

Synthesis of GAP-co-PBMMPL Thermoplastic Elastomer

High molecular weight GAP (162.8 g, 1.64 mol of $CH_2N_3$) was thoroughly dried under vacuum at 50° C. for 4–5 days in a 4-L reaction kettle equipped with a mechanical stirrer, a nitrogen inlet and septa. GAP was then put under a nitrogen stream for the remainder of the reaction. Anhydrous tetrahydrofuran (3 L) was added to the reaction kettle and, after complete dissolution of GAP, a 1.6 M solution of n-butyl lithium in hexane (20.5 mL, 32.9 mmol) was injected, followed by 154.5 g (0.863 mol) of BMMPL. The material (270 g, 85%) was recuperated 24 h later by precipitation in methanol, filtration and drying under vacuum at 60° C. for 2–3 days. DSC analyses indicated a glass transition temperature of −32° C., characteristic of the soft segments of GAP. The melting point of the hard segments, expected above 200° C. from the results obtained for PBMMPL, could not be detected because of the decomposition of GAP beginning at 200° C. The molecular weight of this material could not be determined because of its low solubility in common organic solvents.

EXAMPLE 9

Synthesis of GAP-co-PAMMPL Energetic Thermoplastic Elastomer

In a three-neck flask equipped with a condenser, a thermometer and a magnetic stirrer, were introduced PBMMPL-GAP-PBMMPL (250 g), dimethylformamide (DMF, 5.0 L) and sodium azide (91.0 g, 1.40 mol). The suspension was heated to 90° C. for 18 hours and then poured in a beaker containing water to be stirred vigorously. The polymer was isolated by filtration and dried under vacuum at 60° C. for 24 hours, yielding 160 g of PAMMPL-GAP-PAMMPL. DSC analyses revealed a glass transition temperature of −31° C., a melting point of 86° C. and an enthalpy of fusion of 2–3 Jules/g. Since the polyester is only partly soluble in common organic solvents, its molecular weight could not be determined.

EXAMPLE 10

α-dibromomethyl-β-propiolactone (DBMPL)

1) Preparation of 3-bromo-2,2-dibromomethylpropyl acetate (BDBMPAc)

This synthesis is similar to the one of DBMPAc, except that 60 g of pentaerythritol (0.45 mol) were reacted with 500 mL of hydrogen bromide in acetic acid (30% w/w). The yield of BDBMPAc after the extraction was 92% (152 g, 0.414 mol). This product can be used in the next step without additional purification.

$^1$HNMR: $\delta(CDCl_3)$ ppm: 2.11 (s, 3H,$CH_3$), 3.54 (s, 6H, $CH_2Br$), 4.19 (s, 2H, $CH_2$)

2) Preparation of 3-bromo-2,2-dibromomethyl propionic acid (BDBMPA)

This synthesis is similar to the one of DBMPA, except that for 100 g of BDBMPAc (0.272 mol), 310 mL of concentrated nitric acid (70%, 1.40 g/mL) and 36 mL of fuming nitric acid (1.52 g/mL) were needed. The total yield of BDBMPA ($M_p$: 83–86° C.) was 86% (72 g, 0.21 mol).

$^1$HNMR: $\delta(CDCl_3)$ ppm: 3.77 (s, $CH_2Br$).

3) Preparation of α-dibromomethyl-β-propiolactone (DBMPL)

This synthesis protocol was similar to that for BMMPL. Yields are of between 60% and 70% were residual distillation (55–59° ° C., 1 mm Hg).

$^1$HNMR: $\delta(CDCl_3)$ ppm: 3.79 (s, 4H, $CH_2Br$), 4.45 (s, 2H, $CH_2$).

EXAMPLE 11

α-dichloromethyl-β-propiolactone (DCMPL)

1) Preparation of 3-chloro-2,2-dichloromethylpropyl acetate (CDCMPAc)

This synthesis protocol was similar that for BDBMPAc, except that 20 g of pentaerythritol (0.15 mol) were reacted at 160° C. in a closed vessel with 225 mL of hydrochloric acid and 75 mL of glacial acetic acid. After 24 h, the solution was cooled and transferred into a separatory funnel. After the addition of cold water (300 mL), the organic phase (14.1 g) was separated. NMR analysis revealed that this phase was constituted of a mixture of CDCMPAc (84%) and 2,2-dichloromethylpropyl acetate (DCMPAc). The rest of the solution was extracted with methylene chloride, dried and evaporated to yield again a mixture (14.6 g) of CDCMPAc (46%) and DCMPAc. CDCMPAc could not be completely purified by distillation; it was noted that the boiling temperature rose continuously between 82° C. and 110° C. (1 mm Hg). The first fraction (20.1 g), isolated between 82° C. and 102° C., contained approximately 85% CDCMPAc, while the second one (4.2 g, 103–110° C.) was comprised of 73% CDCMPAc.

$^1$HNMR: $\delta(CDCl_3)$ ppm: 2.10 (s, 3H,$CH_3$), 3.64 (d, 6H, $CH_2Cl$), 4.16 (s, 2H, $CH_2$)

2) Preparation of 3-chloro-2,2-dichloromethyl propionic acid (CDCMPA)

The synthesis protocol was similar to that for DBMPA, except that for 24 g of CDCMPAc, 121 mL of concentrated nitric acid (70%, 1.40 g/mL) and 13.6 mL of fuming nitric acid (1.52 g/mL) were needed. The total yield of CDCMPA was 74% (15.9 g, 0.77 mol).

$^1$HNMR: δ(CDCl$_3$) ppm: 3.87 (s, CH$_2$Cl).
3) Preparation of α-dichloromethyl-β-propiolactone (DCMPL)

The synthesis protocol similar to that for of BMMPL.
$^1$HNMR: δ(CDCl$_3$) ppm: 3.90 (d, 4H, CH$_2$Cl), 4.44 (s, 2H, CH$_2$).

EXAMPLE 12

Poly(α-dibromomethyl-β-propiolactone) (PDBMPL)

The synthesis protocol was similar to that for PBMMPL and PCMMPL. PDBMPL was found to be a fine white powder which was insoluble in most common organic solvents.

EXAMPLE 13

Poly(α-dichloromethyl-β-propiolactone) (PDCMPL)

The synthesis protocol was similar to that for PBMMPL and PCMMPL. PDCMPL was found to be a fine white powder which was insoluble in most common organic solvents.

EXAMPLE 14

Poly(α-diazidomethyl-β-propiolactone) (PDAMPL)

The synthesis is similar to that for PAMMPL, except that for 1.05 g of PDBMPL (4.07 mmol), 12.6 mL of dimethylformamide and 0.581 g of sodium azide (8.9 mmol) were needed. The molecular weight could not be determined because of the low solubility of PDAMPL in common organic solvents.
$^1$HNMR: δ(DMSO) ppm: 3.7 (s, 4H, CH$_2$N$_3$), 4.2 (s, 2H, CH$_2$)

We claim:
1. An energetic thermoplastic polyester of the formula:

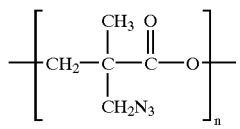

PAMMPL wherein is 4 to 1500.

2. The energetic thermoplastic polyester as set forth in claim 1, wherein the molecular weight ranges from about 500 to about 200 000 g/mol.

3. The energetic thermoplastic polyester as set forth in claim 1, wherein said polyester has a melting point of between 80° C. and 85° C.

4. A process for preparing an energetic thermoplastic polyester of the formula:

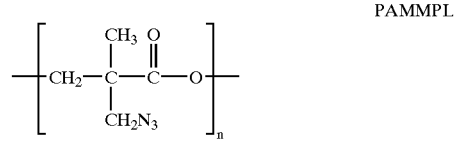

PAMMPL comprising:
polymerizing CMMPL (α-chloromethyl-α-methyl-β-propiolactone) or BMMPL (α-bromomethyl-α-methyl-β-propiolactone); followed by azidation of polymerized CMMPL or BMMPL.

5. The process as set forth in claim 4, wherein said azidation is conducted in dimethylformamide.

6. The process as set forth in claim 5, wherein said azidation of PBMMPL is conducted at a temperature of 90° C.

7. The process as set forth in claim 5, wherein said azidation of PCMMPL is conducted at a temperature of 120° C.

8. The process as set for the in claim 4, wherein a polymerization initiator is employed for initiating polymerization.

9. The process as set for the in claim 8, wherein said process occurs a ratio of 0.1%:25% mol/mol of said initiator to said CMMPL or BMMPL.

10. A process for preparing an energetic thermoplastic polyester of the formula:

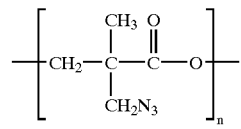

PAMMPL comprising:
polymerizing CMMPL (α-chloromethyl-α-methyl-β-propiolactone) or BMMPL (α-bromomethyl-α-methyl-β-propiolactone); followed by azidation of polymerized CMMPL or BMMPL,
when said propiolactone is halogenated.

11. The process as set forth in claim 10, wherein said propiolactone is halogenated with chlorine or bromine.

* * * * *